US010752352B2

(12) United States Patent
Brand et al.

(10) Patent No.: US 10,752,352 B2
(45) Date of Patent: Aug. 25, 2020

(54) DUAL ROTOR PROPULSION SYSTEMS FOR TILTROTOR AIRCRAFT

(71) Applicant: Textron Innovations Inc., Providence, RI (US)

(72) Inventors: Albert G. Brand, N. Richland Hills, TX (US); Mark Loring Isaac, Fort Worth, TX (US); Frank Bradley Stamps, Colleyville, TX (US); Russell Lee Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 367 days.

(21) Appl. No.: 15/834,340

(22) Filed: Dec. 7, 2017

(65) Prior Publication Data
US 2019/0176980 A1    Jun. 13, 2019

(51) Int. Cl.
*B64C 29/00* (2006.01)
*B64C 11/28* (2006.01)
(Continued)

(52) U.S. Cl.
CPC .......... *B64C 29/0033* (2013.01); *B64C 11/28* (2013.01); *B64C 11/48* (2013.01);
(Continued)

(58) Field of Classification Search
CPC ....... B64C 29/003; B64C 27/28; B64C 27/30; B64C 11/28; B64C 11/48; B64D 35/06
See application file for complete search history.

(56) References Cited

U.S. PATENT DOCUMENTS 2,437,700 A    3/1948   MacFarland, Jr.
3,254,725 A *  6/1966   Higgins .............. B64C 29/0033
                                                         416/149
(Continued)

FOREIGN PATENT DOCUMENTS

CA       2368595 A1    7/2002
CN     103693194 A     4/2014
(Continued)

OTHER PUBLICATIONS

European Search Report; Application No. 18208692.6; EPO; dated Apr. 11, 2019.
(Continued)

*Primary Examiner* — Philip J Bonzell
*Assistant Examiner* — Tye William Abell
(74) *Attorney, Agent, or Firm* — Lawrence Youst PLLC

(57) ABSTRACT

A dual rotor propulsion system for a tiltrotor aircraft having VTOL and forward flight modes. The dual rotor propulsion system includes an engine operable to provide an input torque to a transmission that, responsive thereto, generates an output torque. A first output shaft is coupled to the transmission and is operable to receive a first portion of the output torque. A first rotor assembly is coupled to and rotatable with the first output shaft. A second output shaft is coupled to the transmission and is operable to receive a second portion of the output torque. A second rotor assembly is coupled to and rotatable with the second output shaft. In operation, the first and second rotor assemblies rotate coaxially, the first rotor assembly is a different diameter than the second rotor assembly and the first rotor assembly is stoppable and foldable in the forward flight mode.

18 Claims, 11 Drawing Sheets

(51) Int. Cl.
  *B64C 27/54* (2006.01)
  *B64C 11/48* (2006.01)
  *B64C 27/28* (2006.01)
  *B64C 27/30* (2006.01)
  *B64D 35/06* (2006.01)
  *F16H 48/10* (2012.01)

(52) U.S. Cl.
  CPC .............. *B64C 27/28* (2013.01); *B64C 27/54* (2013.01); *B64D 35/06* (2013.01); *F16H 48/10* (2013.01); *B64C 27/30* (2013.01)

(56) References Cited

U.S. PATENT DOCUMENTS

| | | | |
|---|---|---|---|
| 5,381,985 A * | 1/1995 | Wechsler | ................ B64C 11/48 |
| | | | 244/12.4 |
| 5,823,468 A | 10/1998 | Bothe | |
| D453,317 S | 2/2002 | DeTore et al. | |
| D458,892 S | 6/2002 | DeTore et al. | |
| 7,004,426 B2 | 2/2006 | Kisor | |
| 8,800,912 B2 | 8/2014 | Oliver | |
| 9,835,093 B2 | 12/2017 | Golshany et al. | |
| 2007/0158494 A1 | 7/2007 | Burrage | |
| 2011/0001020 A1 * | 1/2011 | Forgac | ................ B64C 39/024 |
| | | | 244/7 A |
| 2011/0180656 A1 | 7/2011 | Shue et al. | |
| 2011/0315809 A1 * | 12/2011 | Oliver | ................ B64D 27/12 |
| | | | 244/12.4 |
| 2013/0039764 A1 | 2/2013 | Perkinson | |
| 2015/0360775 A1 * | 12/2015 | Arai | ................ B64C 37/00 |
| | | | 244/12.1 |
| 2016/0031555 A1 | 2/2016 | Bevirt et al. | |
| 2016/0046382 A1 | 2/2016 | Alber | |
| 2016/0076629 A1 | 3/2016 | Modrzejewski et al. | |
| 2016/0244158 A1 | 8/2016 | Fredericks et al. | |
| 2017/0144746 A1 * | 5/2017 | Schank | ................ B64C 29/0033 |
| 2018/0281942 A1 | 10/2018 | Scott et al. | |
| 2018/0370625 A1 * | 12/2018 | Netzer | ................ B64D 47/08 |

FOREIGN PATENT DOCUMENTS

| | | |
|---|---|---|
| CN | 104229129 A | 12/2014 |
| DE | 102006028226 A1 | 12/2007 |
| WO | 2015073084 A1 | 5/2015 |
| WO | 2016062223 A1 | 4/2016 |

OTHER PUBLICATIONS

European Exam Report; Application No. 18208692.6; EPO; dated May 16, 2019.

* cited by examiner

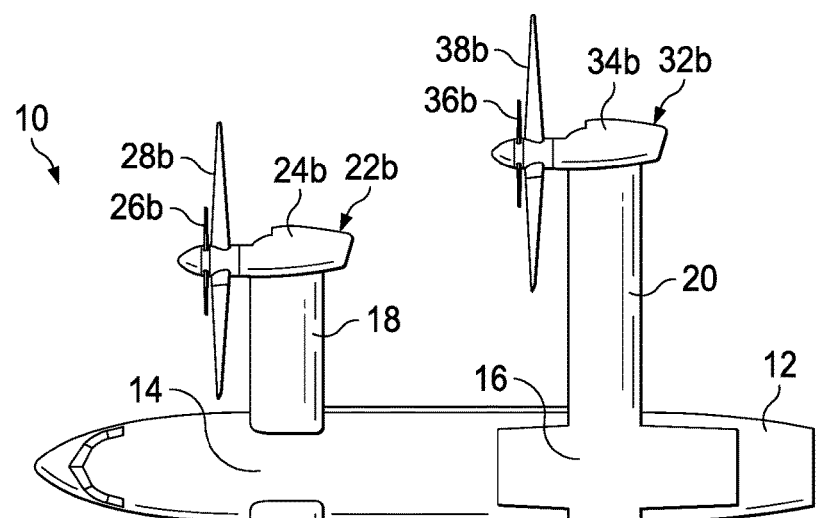
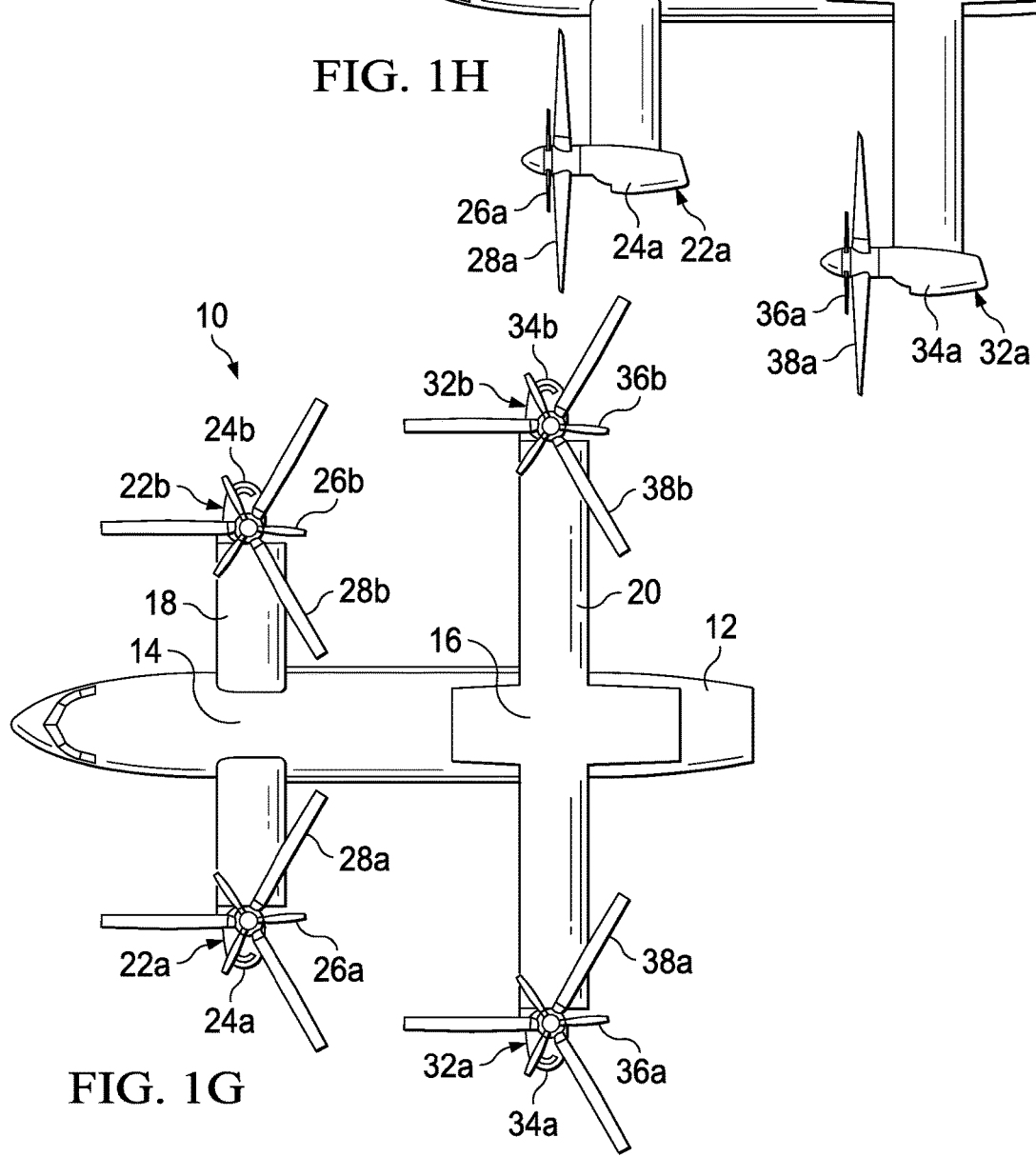
FIG. 1H
FIG. 1G

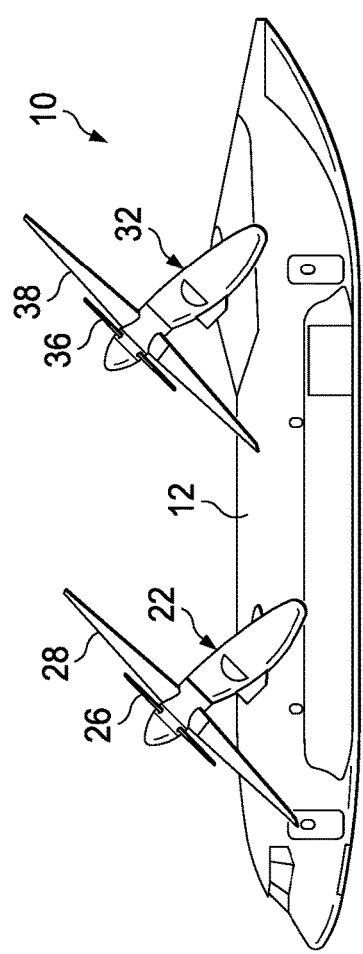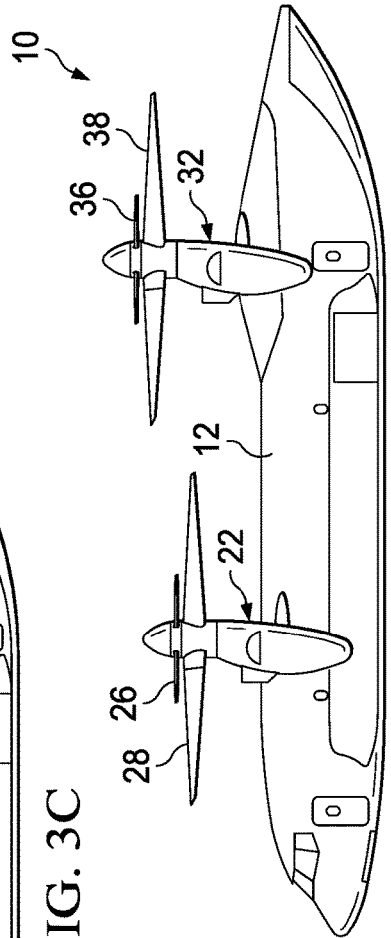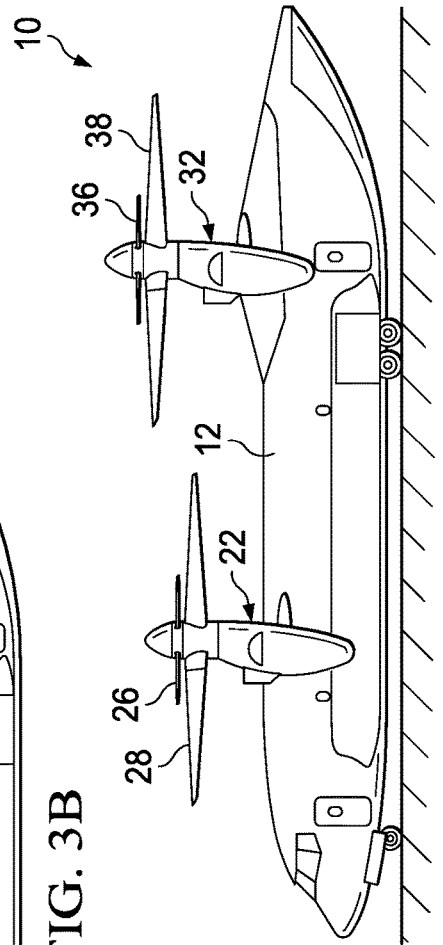

DUAL ROTOR PROPULSION SYSTEMS FOR TILTROTOR AIRCRAFT

TECHNICAL FIELD OF THE DISCLOSURE

The present disclosure relates, in general, to aircraft having a forward flight mode and a vertical takeoff and landing flight mode and, in particular, to tiltrotor aircraft having dual rotor propulsion systems each including first and second coaxial rotor assemblies having different diameters.

BACKGROUND

Fixed-wing aircraft use wings to generate lift in response to the forward airspeed of the aircraft. Forward airspeed is generally maintained by forward thrust from one or more jet engines or propellers. For the wings to generate sufficient lift, a fixed-wing aircraft must achieve takeoff speed and therefore requires a runway for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter, which is a rotorcraft having one or more rotors that provide vertical lift and forward thrust to the aircraft. Helicopter rotors not only enable hovering, vertical takeoff and vertical landing, but also enable, forward, aftward and lateral flight. These attributes make helicopters highly versatile for use in congested, isolated or remote areas where fixed-wing aircraft may be unable to takeoff and land. Helicopters, however, typically lack the ability to achieve high forward airspeed or the forward flight efficiency of fixed-wing aircraft.

A tiltrotor aircraft is another example of a VTOL aircraft. Tiltrotor aircraft utilize tiltable rotor systems that are operable to transition between a vertical lift orientation and a forward thrust orientation. The rotor systems are tiltable relative to a fuselage and/or a fixed wing such that the associated proprotors have a generally horizontal plane of rotation for vertical takeoff, hovering and vertical landing and a generally vertical plane of rotation for forward flight, wherein the wing provides lift. Taking advantage of these features, tiltrotor aircraft combine the vertical lift capability of a helicopter with the speed and range of fixed-wing aircraft. It has been found, however, that the large diameter rotor systems of tiltrotor aircraft can become unstable as speed increases.

SUMMARY

In a first aspect, the present disclosure is directed to a dual rotor propulsion system for a tiltrotor aircraft having a vertical takeoff and landing flight mode and a forward flight mode. The dual rotor propulsion system includes an engine operable to provide an input torque. A transmission is coupled to the engine and is operable to receive the input torque and generate an output torque. A first output shaft is coupled to the transmission and is operable to receive a first portion of the output torque. A first rotor assembly is coupled to and rotatable with the first output shaft. A second output shaft is coupled to the transmission and is operable to receive a second portion of the output torque. A second rotor assembly is coupled to and rotatable with the second output shaft. In operation, the first and second rotor assemblies rotate coaxially, the first rotor assembly has a different diameter than the second rotor assembly and the first rotor assembly is stoppable and foldable in the forward flight mode.

In certain embodiments, the transmission may include a clutch system operable to selectively engage and disengage torque paths to the first and second output shafts. In some embodiments, the transmission may be a differential transmission including, for example, a ring gear, a spider gear set coupled to the ring gear, a first output gear coupled between the spider gear set and the first output shaft and a second output gear coupled between the spider gear set and the second output shaft. In such embodiments, the rotational speed of the ring gear may be equal to half the sum of the rotational speed of the first output shaft and the rotational speed of the second output shaft such that, at a constant engine operating speed, reduction in the rotational speed of the first rotor assembly causes an increase in the rotational speed of the second rotor assembly up to a maximum rotational speed of the second rotor assembly when the first rotor assembly is stopped.

In certain embodiments, the first rotor assembly may have a larger diameter than the second rotor assembly. In some embodiments, the first and second rotor assemblies may co-rotate. In other embodiments, the first and second rotor assemblies may counter-rotate. In certain embodiments, the second rotor assembly may be a rigid rotor assembly having collective pitch control. In some embodiments, the first rotor assembly may be a gimbaled rotor assembly having collective pitch control and cyclic pitch control. In certain embodiments, the first rotor assembly may be a rigid rotor having collective pitch control. In some embodiments, the first rotor assembly may be aft of the second rotor assembly in the forward flight mode. In certain embodiments, the first rotor assembly may be aerodynamically stoppable in response to rotor blade feathering and/or power delivery to the second rotor. In some embodiments, a brake unit may be operably associated with the first output shaft and operable to stop the rotation of the first rotor assembly. In certain embodiments, a lock assembly may be operably associated with the first output shaft and operable to prevent rotation of the first rotor assembly. In some embodiments, a brake unit may be operably associated with the second output shaft and operable to stop the rotation of the second rotor assembly. In certain embodiments, a lock assembly may be operably associated with the second output shaft and operable to prevent rotation of the second rotor assembly.

In a second aspect, the present disclosure is directed to a tiltrotor aircraft having a vertical takeoff and landing flight mode and a forward flight mode. The aircraft includes a longitudinally extending fuselage with a first wing extending laterally therefrom and having first and second outboard ends. First and second dual rotor propulsion systems are respectively coupled to the first wing between the fuselage and the first and second outboard ends. The first and second dual rotor propulsion systems are reversibly tiltable relative to the first wing between vertical lift and forward thrust orientations. Each dual rotor propulsion system includes an engine operable to provide an input torque. A transmission is coupled to the engine and is operable to receive the input torque and generate an output torque. A first output shaft is coupled to the transmission and is operable to receive a first portion of the output torque. A first rotor assembly is coupled to and rotatable with the first output shaft. A second output shaft is coupled to the transmission and is operable to receive a second portion of the output torque. A second rotor assembly is coupled to and rotatable with the second output shaft. In operation, the first and second rotor assemblies rotate coaxially, the first rotor assembly has a different diameter than the second rotor assembly and the first rotor assembly is stoppable and foldable in the forward flight mode.

In certain embodiments, the aircraft may include a second wing extending laterally from the fuselage aft of the first wing with the second wing having third and fourth outboard ends. Third and fourth dual rotor propulsion systems may be coupled to the second wing between the fuselage and the third and fourth outboard ends. The third and fourth dual rotor propulsion systems may be reversibly tiltable relative to the second wing between vertical lift and forward thrust orientations.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1H are schematic illustrations of a tiltrotor aircraft having dual rotor propulsion systems in accordance with embodiments of the present disclosure;

FIGS. 3A-3I are schematic illustrations of a tiltrotor aircraft having dual rotor propulsion systems in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
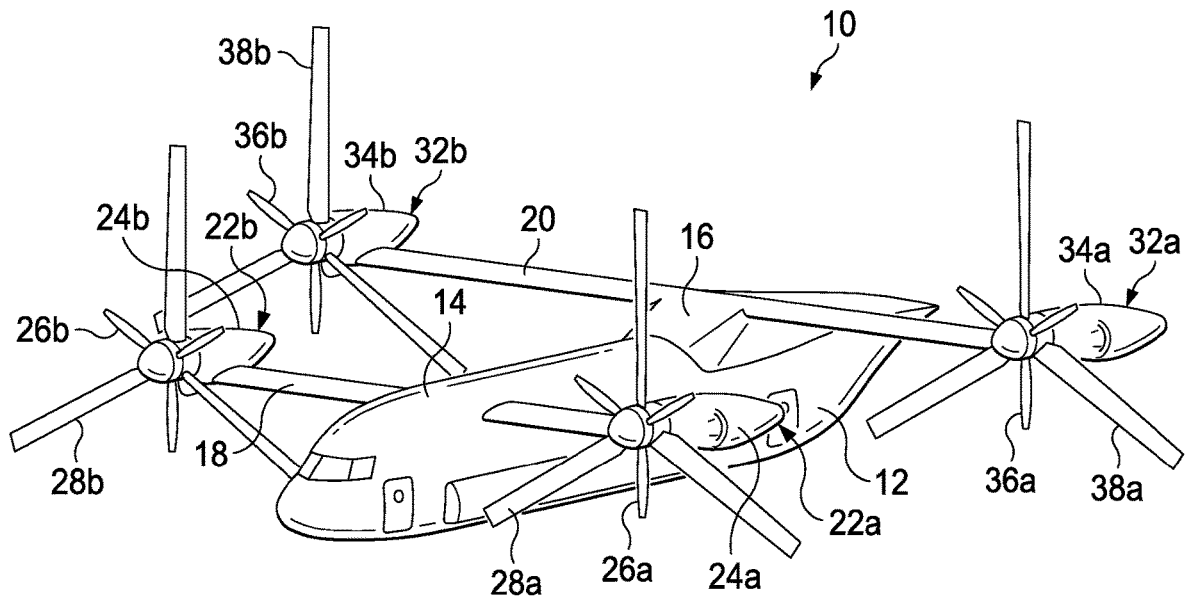
Figure 1A:
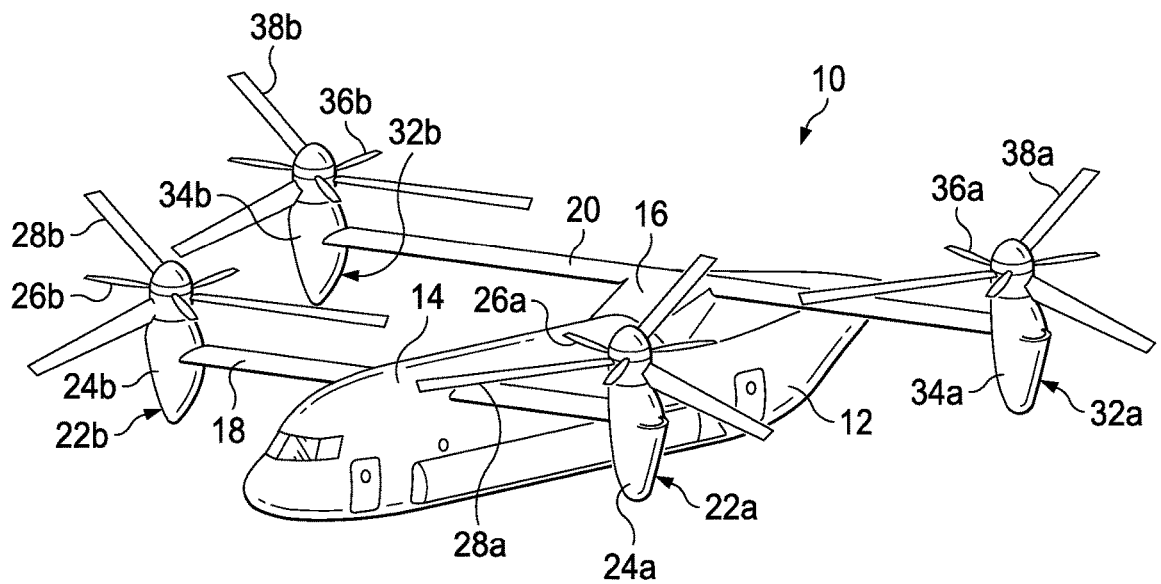
Figure 1D:
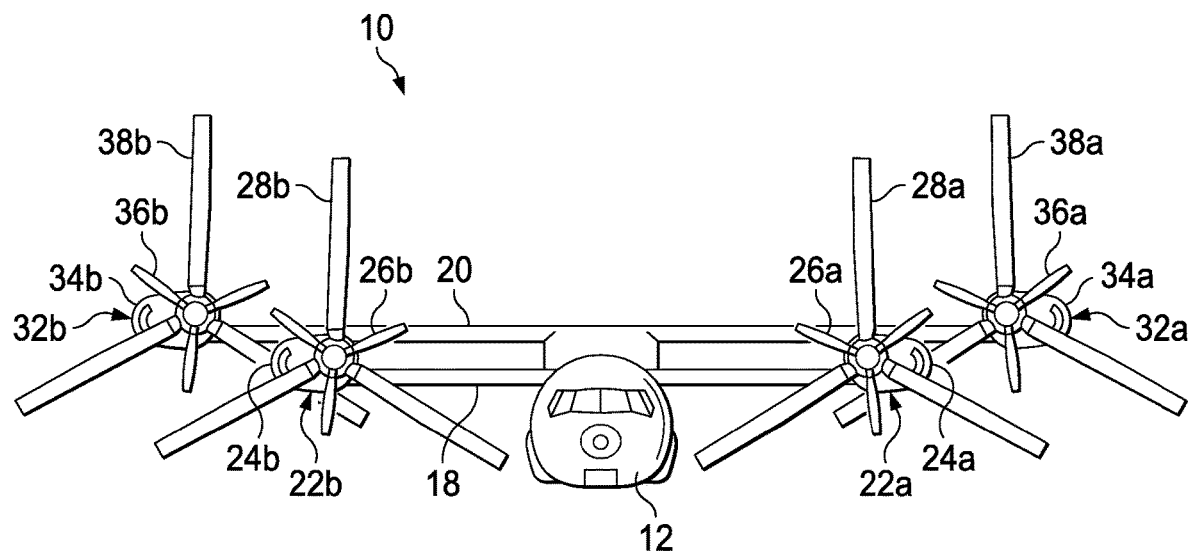
Figure 1C:
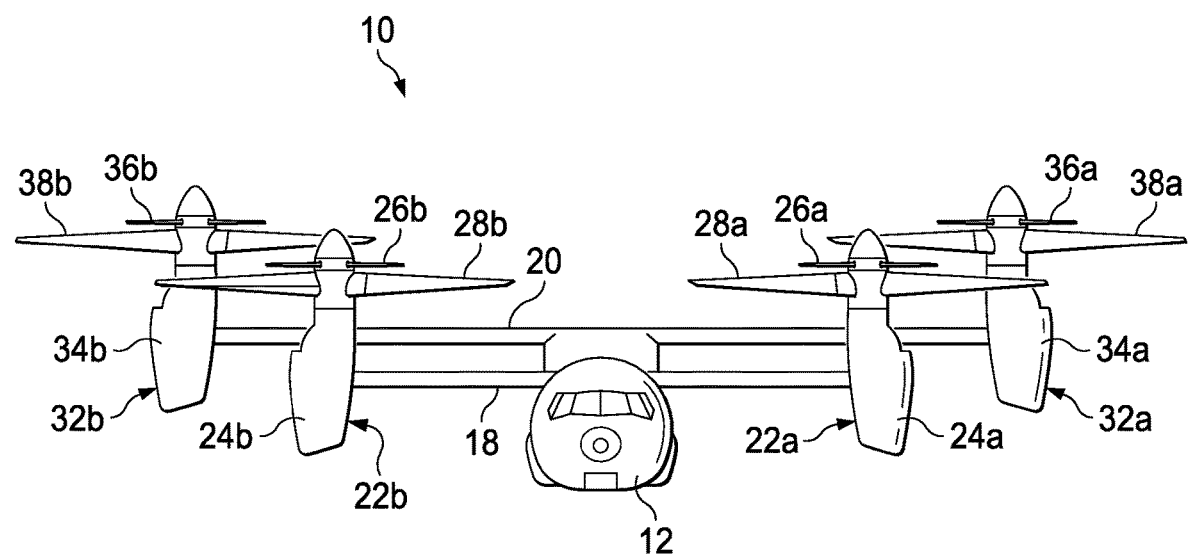
Figure 1F:
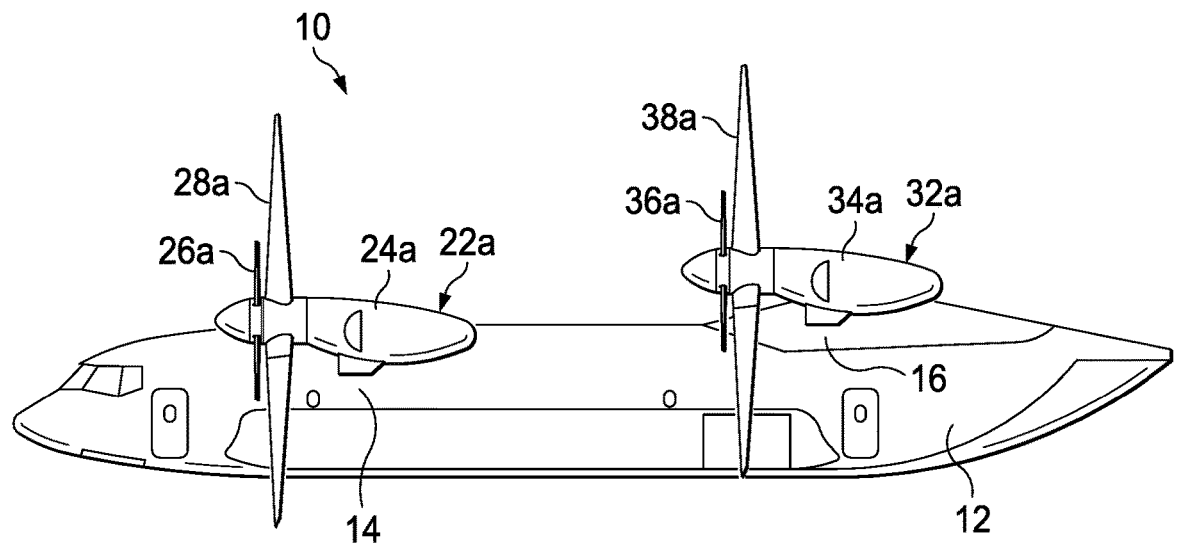
Figure 1E:
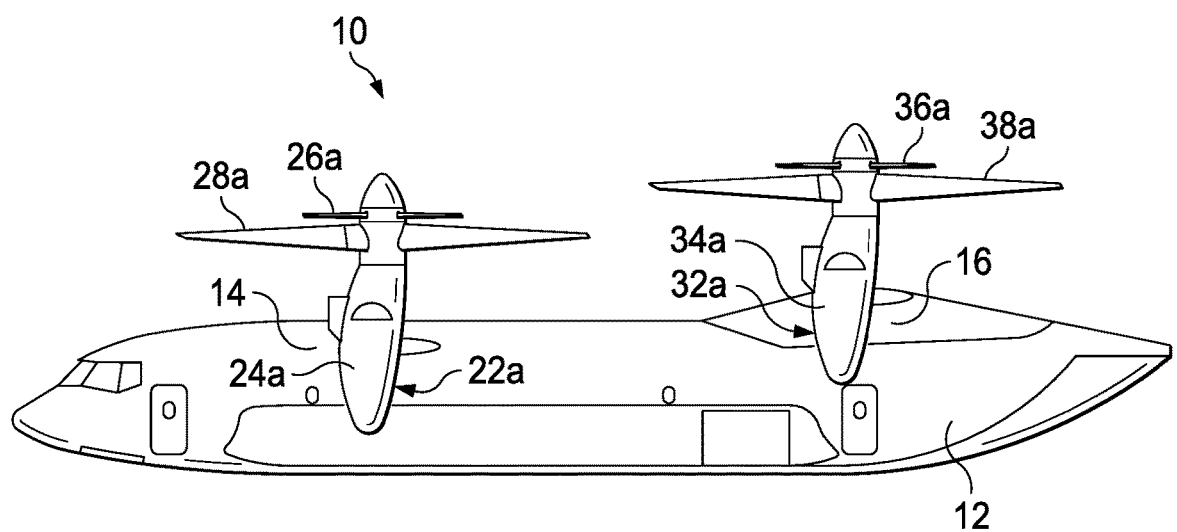

Referring to FIGS. 1A-1H in the drawings, various views of a quad tiltrotor aircraft 10 having dual rotor propulsion systems are depicted. In the illustrated embodiment, aircraft 10 has a longitudinally extending fuselage 12 that includes a forward station 14 and an aft station 16. Aircraft 10 includes a forward wing 18 that extends laterally from both sides of forward station 14 of fuselage 12. Aircraft 10 also includes an aft wing 20 that extends laterally from both sides of aft station 16 of fuselage 12. Each of wings 18, 20 has an airfoil cross-section that generates lift responsive to the forward airspeed of aircraft 10. Wings 18, 20 may include flaperons or other aerodynamic surfaces for controlling, for example, pitch and roll in the forward flight mode of aircraft 10. Wings 18, 20 are preferably formed from high strength and lightweight materials such as metals, polymers, fiberglass, carbon and combinations thereof. In the illustrated embodiment, the span of aft wing 20 is greater than the span of forward wing 18, as best seen in FIGS. 1G-1H. Also, in the illustrated embodiment, the elevation of aft wing 20 is greater than the elevation of forward wing 18 when aircraft 10 is in level flight, as best seen in FIGS. 1C-1D. In other embodiments, wings 18, 20 could have other configurations including having the same span and/or being at the same elevation. Together, fuselage 12 and wings 18, 20 as well as various frames, supports, longerons, stringers, bulkheads, spars, ribs, skins and the like may be considered to be the airframe of aircraft 10.

Coupled to outboard ends of forward wing 18 are propulsion assemblies 22a, 22b. Propulsion assembly 22a includes a nacelle 24a and a dual rotor system having two coaxial rotor assemblies depicted as a smaller diameter rotor assembly 26a and a larger diameter rotor assembly 28a. Nacelle 24a preferably houses an engine and transmission that provides torque and rotational energy to smaller rotor assembly 26a and larger rotor assembly 28a. Nacelle 24a is reversibly tiltable relative to forward wing 18 between a vertical lift orientation wherein smaller rotor assembly 26a and larger rotor assembly 28a rotate in a generally horizontal plane, as best seen in FIGS. 1A, 1C, 1E, 1G, and a forward thrust orientation wherein smaller rotor assembly 26a and larger rotor assembly 28a rotate in a generally vertical plane, as best seen in FIGS. 1B, 1D, 1F, 1H. Similarly, propulsion assembly 22b includes a nacelle 24b and a dual rotor system having two coaxial rotor assemblies depicted as a smaller diameter rotor assembly 26b and a larger diameter rotor assembly 28b. Nacelle 24b preferably houses an engine and transmission that provides torque and rotational energy to smaller rotor assembly 26b and larger rotor assembly 28b. Nacelle 24b is reversibly tiltable relative to forward wing 18 between a vertical lift orientation wherein smaller rotor assembly 26b and larger rotor assembly 28b rotate in a generally horizontal plane, as best seen in FIGS. 1A, 1C, 1E, 1G, and a forward thrust orientation wherein smaller rotor assembly 26b and larger rotor assembly 28b rotate in a generally vertical plane, as best seen in FIGS. 1B, 1D, 1F, 1H.

Coupled to outboard ends of aft wing 20 are propulsion assemblies 32a, 32b. Propulsion assembly 32a includes a nacelle 34a and a dual rotor system having two coaxial rotor assemblies depicted as a smaller diameter rotor assembly 36a and a larger diameter rotor assembly 38a. Nacelle 34a preferably houses an engine and transmission that provides torque and rotational energy to smaller rotor assembly 36a and larger rotor assembly 38a. Nacelle 34a is reversibly tiltable relative to aft wing 20 between a vertical lift orientation wherein smaller rotor assembly 36a and larger rotor assembly 38a rotate in a generally horizontal plane, as best seen in FIGS. 1A, 1C, 1E, 1G, and a forward thrust orientation wherein smaller rotor assembly 36a and larger rotor assembly 38a rotate in a generally vertical plane, as best seen in FIGS. 1B, 1D, 1F, 1H. Likewise, propulsion assembly 32b includes a nacelle 34b and a dual rotor system having two coaxial rotor assemblies depicted as a smaller diameter rotor assembly 36b and a larger diameter rotor assembly 38b. Nacelle 34b preferably houses an engine and transmission that provides torque and rotational energy to smaller rotor assembly 36b and larger rotor assembly 38b. Nacelle 34b is reversibly tiltable relative to aft wing 20 between a vertical lift orientation wherein smaller rotor assembly 36b and larger rotor assembly 38b rotate in a generally horizontal plane, as best seen in FIGS. 1A, 1C, 1E, 1G, and a forward thrust orientation wherein smaller rotor assembly 36b and larger rotor assembly 38b rotate in a generally vertical plane, as best seen in FIGS. 1B, 1D, 1F, 1H.

In the illustrated embodiment, smaller rotor assemblies 26a, 26b, 36a, 36b and larger rotor assemblies 28a, 28b, 38a, 38b each include three rotor blades. It should be understood by those having ordinary skill in the art, however, that smaller rotor assemblies 26a, 26b, 36a, 36b and/or larger rotor assemblies 28a, 28b, 38a, 38b could alternatively have a different number of rotor blades, either less than or greater than three. In addition, it should be understood that the position of propulsion assemblies 22a, 22b, 32a, 32b, the angular velocity or revolutions per minute (RPM) of smaller rotor assemblies 26a, 26b, 36a, 36b and larger rotor assemblies 28a, 28b, 38a, 38b, the pitch of the rotor blades and the like may be controlled by the pilot of aircraft 10 and/or a flight control system to selectively control the direction, thrust and lift of aircraft 10 during flight. Further, it should be understood by those having ordinary skill in the art that propulsion assemblies 22a, 22b, 32a, 32b could alternatively have fixed nacelles each housing an engine and a fixed portion of the transmission with a pylon assembly that is rotatable relative to the fixed nacelle and the wing to transition smaller rotor assemblies 26a, 26b, 36a, 36b and larger rotor assemblies 28a, 28b, 38a, 38b between the vertical lift and forward thrust orientations.

Figure 6:
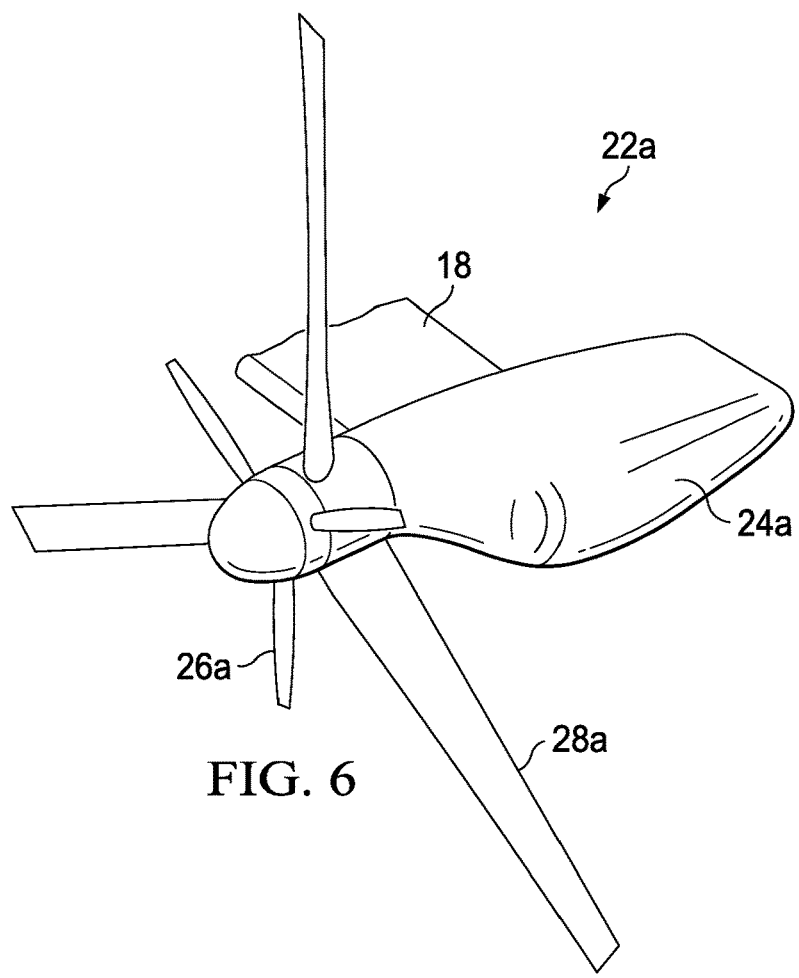
FIG. 6 is an isometric view of a dual rotor assembly for a dual rotor propulsion system of a tiltrotor aircraft in accordance with embodiments of the present disclosure.

Referring additionally to FIG. 6, an enlarged view of propulsion assembly 22a is depicted. Propulsion assembly 22a is substantially similar to propulsion assemblies 22b, 32a, 32b therefore, for sake of efficiency, certain features will be disclosed only with regard to propulsion assembly 22a. One having ordinary skill in the art, however, will fully appreciate an understanding of propulsion assemblies 22b, 32a, 32b based upon the disclosure herein of propulsion assembly 22a. As illustrated, propulsion assembly 22a includes a smaller diameter rotor assembly 26a and a larger diameter rotor assembly 28a with smaller diameter rotor assembly 26a forward of larger diameter rotor assembly 28a in the forward flight mode of aircraft 10. This unique configuration provides both high lift efficiency in the vertical takeoff and landing flight mode of aircraft 10 and high thrust efficiency in the forward flight mode of aircraft 10. Smaller rotor assembly 26a is optimized for forward thrust while larger rotor assembly 28a is optimized for vertical lift. In the illustrated embodiment, smaller rotor assembly 26a is a rigid rotor assembly having collective pitch control such that smaller rotor assembly 26a exhibits the characteristics of a conventional turboprop rotor. Larger rotor assembly 28a is a gimbaled rotor assembly having collective pitch control and cyclic pitch control such that larger rotor assembly 28a exhibits the characteristics of a conventional helicopter rotor. In other embodiments, smaller rotor assembly 26a may be a gimbaled rotor having cyclic pitch control and/or larger rotor assembly 28a may be a rigid rotor having only collective pitch control. In the illustrated embodiment, the ratio of the diameters of smaller rotor assembly 26a to larger rotor assembly 28a is between about 1 to 4 and about 1 to 3.

As discussed herein, in the vertical takeoff and landing flight mode of aircraft 10, larger rotor assemblies 28a, 28b, 38a, 38b may generate more than 80 percent and up to 100 percent of the vertical lift requirements. Once aircraft 10 has transitioned to forward flight mode, the rotor blades of larger rotor assemblies 28a, 28b, 38a, 38b are preferably folded to reduce drag in which case smaller rotor assembly 22a, 22b, 32a, 32b generate 100 percent of the forward thrust. Each propulsion assembly 22a, 22b, 32a, 32b is independently controllable such that operational changes of certain propulsion assemblies enable pitch, roll and yaw control of aircraft 10 during VTOL operations. It is noted that smaller rotor assemblies 22a, 22b, 32a, 32b may or may not be rotating during VTOL operations. In addition, it should be noted that smaller rotor assemblies 22a, 22b, 32a, 32b may co-rotate or counter-rotate relative to their respective larger rotor assemblies 28a, 28b, 38a, 38b. In the illustrated embodiment, larger rotor assemblies 28a, 28b counter-rotate and larger rotor assemblies 38a, 38b counter-rotate.

Regardless of the operational status of smaller rotor assemblies 22a, 22b, 32a, 32b, pitch, roll and yaw control of aircraft 10 during VTOL operations can be achieved by operational changes in larger rotor assemblies 28a, 28b, 38a, 38b. For example, by changing the thrust output of larger rotor assemblies 28a, 28b relative to larger rotor assemblies 38a, 38b, pitch control is achieved. As another example, by changing the thrust output of larger rotor assemblies 28a, 38a relative to larger rotor assemblies 28b, 38b, roll control is achieved. Changing the relative thrust outputs of the various propulsion assembly 22a, 22b, 32a, 32b may be accomplished using, for example, differential collective control.

It should be appreciated that quad tiltrotor aircraft 10 is merely illustrative of a variety of aircraft that can implement the embodiments disclosed herein. Indeed, the dual rotor propulsion systems of the present disclosure may be utilized on any number of other aircraft. For example, dual rotor propulsion system implementations may be useful on hybrid aircraft, tiltrotor aircraft, tiltwing aircraft, unmanned aircraft, gyrocopters, airplanes and the like. As such, those skilled in the art will recognize that the dual rotor propulsion systems of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
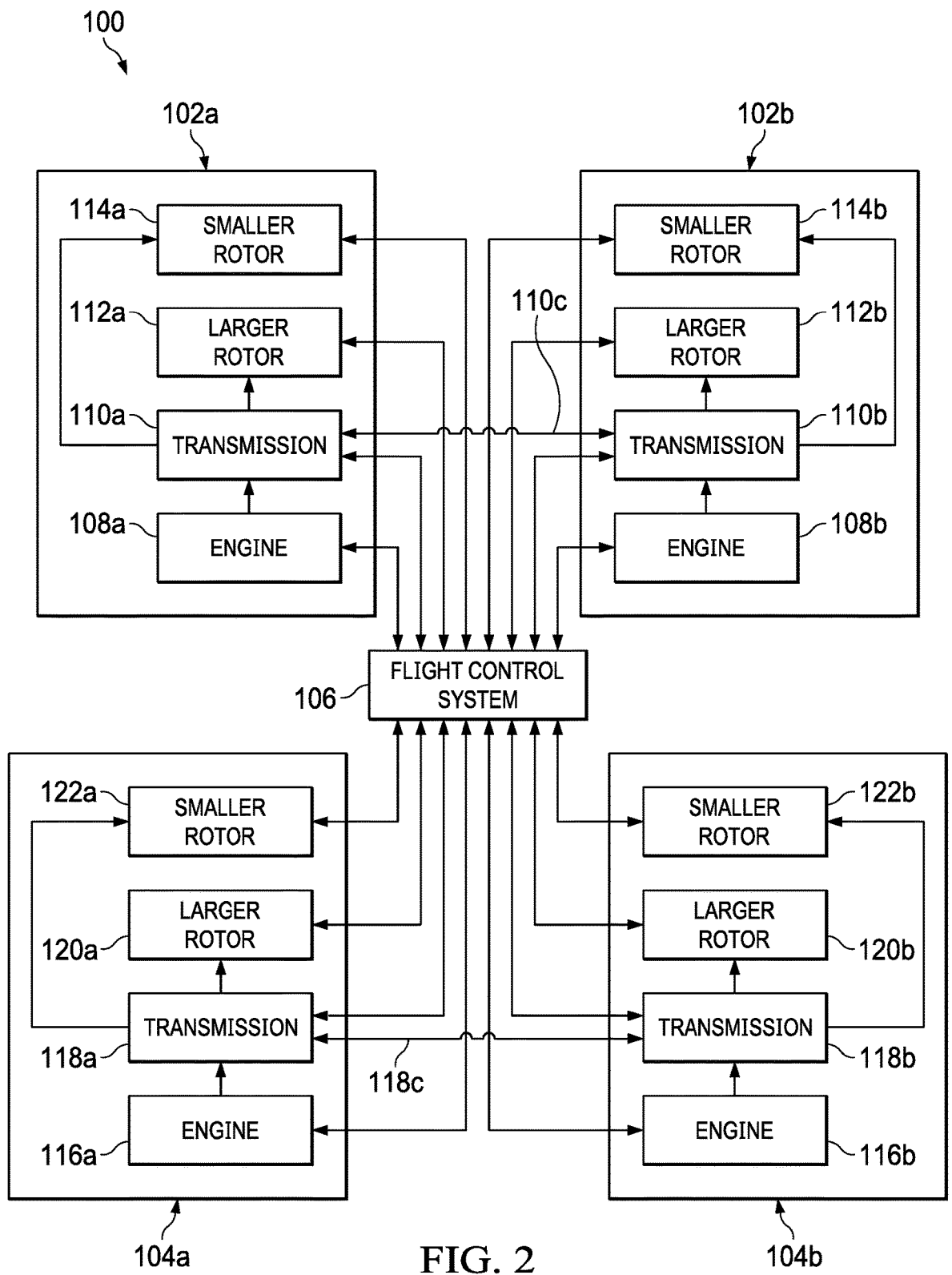
FIG. 2 is a block diagram of propulsion and control systems for a tiltrotor aircraft having dual rotor propulsion systems in accordance with embodiments of the present disclosure.

Referring additionally to FIG. 2, a block diagram depicts a propulsion and control systems for a quad tiltrotor aircraft 100 having dual rotor propulsion systems. Aircraft 100 includes propulsion assemblies 102a, 102b, 104a, 104b and a flight control system 106. Propulsion assembly 102a includes engine 108a, transmission 110a, larger rotor assembly 112a and smaller rotor assembly 114a. Propulsion assembly 102b includes engine 108b, transmission 110b, larger rotor assembly 112b and smaller rotor assembly 114b. Propulsion assembly 104a includes engine 116a, transmission 118a, larger rotor assembly 120a and smaller rotor assembly 122a. Propulsion assembly 104b includes engine 116b, transmission 118b, larger rotor assembly 120b and smaller rotor assembly 122b.

In the illustrated embodiment, engines 108a, 108b, 116a, 116b are internal combustion engines, such as turboshaft engines, operable to burn a liquid fluid. Alternatively, engines 108a, 108b, 116a, 116b could be one or more electric or hydraulic motors. In the illustrated embodiment, transmissions 110a, 110b, 118a, 118b are gear-reducing transmissions designed to enable optimum engine speed and optimal rotor speed during flight operations. As discussed herein, transmissions 110a, 110b, 118a, 118b may be of two types. The first type uses a clutch system to selectively engage and disengage torque paths to transmit power to smaller rotor assemblies 114a, 114b, 122a, 122b and larger rotor assemblies 112a, 112b, 120a, 120b. The second types uses a differential drive mechanism to shift torque between torque paths to transmit power to smaller rotor assemblies 114a, 114b, 122a, 122b and larger rotor assemblies 112a, 112b, 120a, 120b. In either implementation, transmissions 110a, 110b, 118a, 118b enable the stopping and starting of rotation of larger rotor assemblies 112a, 112b, 120a, 120b during the forward flight mode of aircraft 100. For example, when it is desired to transition aircraft 100 to its high efficiency and/or high speed cruise mode, the rotation of larger rotor assemblies 112a, 112b, 120a, 120b may be aerodynamically and/or mechanically stopped and preferably locked against rotation. In the stopped configuration of larger rotor assemblies 112a, 112b, 120a, 120b, the rotor blades of larger rotor assemblies 112a, 112b, 120a, 120b are preferably folded to reduce drag with smaller rotor assemblies 114a, 114b, 122a, 122b providing the required forward thrust. Likewise, transmissions 110a, 110b, 118a, 118b enable the stopping and starting of rotation of smaller rotor assemblies 114a, 114b, 122a, 122b during VTOL flight operations of aircraft 100.

In the illustrated embodiment, a cross shaft 110c couples transmissions 110a, 110b together such that either engine 108a, engine 108b or both can drive each of larger rotor assemblies 112a, 112b and smaller rotor assemblies 114a, 114b. In other embodiments, transmissions 110a, 110b are not coupled together with a cross shaft. In the illustrated embodiment, a cross shaft 118c couples transmissions 118a, 118b together such that either engine 116a, engine 116b or both can drive each of smaller rotor assemblies 122a, 122b and larger rotor assemblies 120a, 120b. As discussed herein, the use of coaxially rotating smaller rotor assemblies 114a, 114b, 122a, 122b and larger rotor assemblies 112a, 112b, 120a, 120b, provides both high lift efficiency in the vertical takeoff and landing flight mode of aircraft 100 and high thrust efficiency in the forward flight mode of aircraft 100.

Flight control system 106, such as a digital flight control system, is preferably a redundant flight control system and more preferably a triply redundant flight control system including three independent flight control computers. Use of triply redundant flight control system 106 improves the overall safety and reliability of aircraft 100 in the event of a single or dual failure in flight control system 106. Flight control system 106 preferably includes non-transitory computer readable storage media including a set of computer instructions executable by one or more processors for controlling the operation of the distributed propulsion system. Flight control system 106 may be implemented on one or more general-purpose computers, special purpose computers or other machines with memory and processing capability. For example, flight control system 106 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 106 may be a microprocessor-based system operable to execute program code in the form of machine-executable instructions. In addition, flight control system 106 may be selectively connectable to other computer systems via a proprietary encrypted network, a public encrypted network, the Internet or other suitable communication network that may include both wired and wireless connections.

Flight control system 106 communicates via a wired and/or wireless communications network depicted as the communication arrows between flight control system 106 and the various components of each propulsion assembly 102a, 102b, 104a, 104b. Flight control system 106 receives sensor data from and sends flight command information to each propulsion assembly 102a, 102b, 104a, 104b to individually and independently control and operate each propulsion assembly 102a, 102b, 104a, 104b. Flight control system 106 may autonomously control some or all aspects of flight operation for aircraft 100. Flight control system 106 may also be operable to communicate with one or more remote systems, via a wireless communications protocol. The remote systems may be operable to receive flight data from and provide commands to flight control system 106 to enable remote flight control over some or all aspects of flight operation for aircraft 100. A pilot within aircraft 100 may receive flight data from and provide commands to flight control system 106 to enable onboard pilot control over some or all aspects of flight operation for aircraft 100.

As examples, flight control system 106 is operable to independently start, stop and control the operational speeds of the engines. Flight control system 106 is operable to independently or collectively operate the propulsion assemblies between the vertical lift and forward thrust orientations. Flight control system 106 is operable to independently or collectively change the pitch of the rotor blades. Flight control system 106 is operable to independently or collectively stop and start the rotation of the larger rotor assemblies. Flight control system 106 is operable to independently or collectively fold and unfold the rotor blades of the larger rotor assemblies.

Figure 3F:
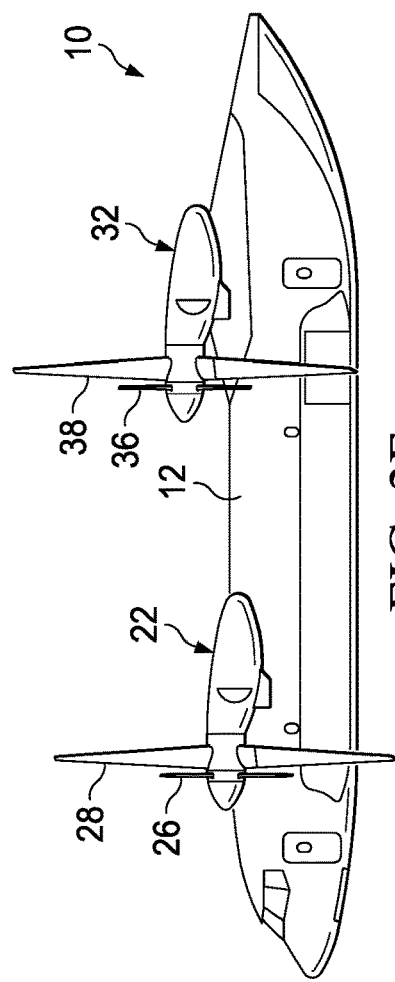

Referring next to FIGS. 3A-3I in the drawings, a sequential flight-operating scenario of aircraft 10 is depicted. It is noted that reference to the port and starboard components of aircraft 10 will be made collectively in FIGS. 3A-3I. For example, a reference to propulsion assemblies 22 in FIGS. 3A-3I is equivalent to the reference to propulsion assemblies 22a, 22b in FIGS. 1A-1G. As best seen in FIG. 3A, aircraft 10 is positioned on a launch surface at a current location. Aircraft 10 is in the vertical lift orientation of propulsion assemblies 22, 32 with at least larger rotor assemblies 28, 38 operating to provide high lift efficiency for aircraft 10. Smaller rotor assemblies 26, 36 may or may not be rotated during such VTOL operations. Aircraft 10 may be operating responsive to autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations.

Figure 3E:
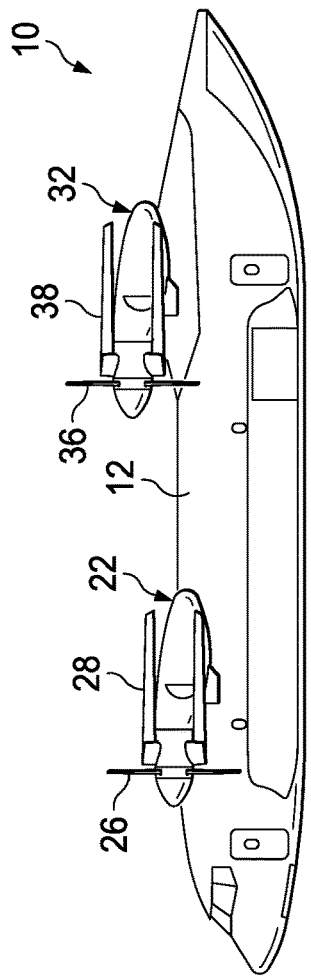
Figure 3D:
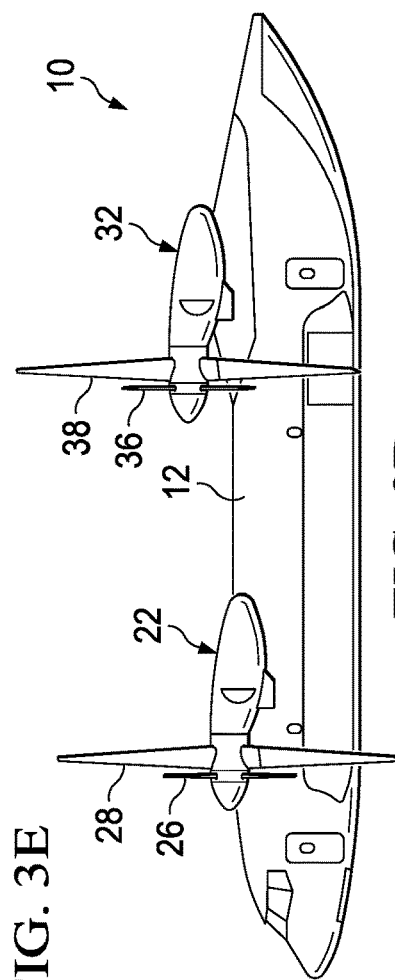

Regardless of the chosen flight control mode, each of propulsion assemblies 22, 32 may be independently controllable during flight operations. After vertical assent to the desired elevation, aircraft 10 may begin the transition from vertical takeoff to forward flight. As best seen in FIGS. 3B-3D, as aircraft 10 transitions from vertical takeoff and landing flight mode to forward flight mode, propulsion assemblies 22, 32 transition from the vertical lift orientation, as best seen in FIG. 3B, to the forward thrust orientation, as best seen in FIG. 3D, by tilting from an upward pointing thrust orientation to a forward pointing thrust orientation. It is noted that aircraft 10 remains in a generally horizontal attitude during this transition for the safety and comfort of passengers, crew and/or cargo carried in aircraft 10.

Once aircraft 10 has completed the transition to forward flight mode, aircraft 10 may now transition to high efficiency cruise mode. If smaller rotor assemblies 26, 36 were not operating during vertical takeoff or the transition to forward flight mode, smaller rotor assemblies 26, 36 may now commence operations. As smaller rotor assemblies 26, 36 ramp up to operating speed, power may be transitioned from larger rotor assemblies 28, 38 to smaller rotor assemblies 26, 36 using, for example, a clutch system or a differential assembly. Once smaller rotor assemblies 26, 36 are providing the desired forward thrust, larger rotor assemblies 28, 38 may be shut down. This process may involve aerodynamic and/or mechanical braking to stop the rotation of larger rotor assemblies 28, 38 as well as locking of larger rotor assemblies 28, 38 to prevent further rotation of larger rotor assemblies 28, 38. As best seen in FIG. 3E, once larger rotor assemblies 28, 38 are stopped and locked, the rotor blades of larger rotor assemblies 28, 38 may be folded to reduce drag. In this configuration, the smaller rotor assemblies are operated to provide high thrust efficiency for aircraft 10 during cruise operations such that aircraft 10 may engage in high-speed and/or long range flight.

Figure 3G:
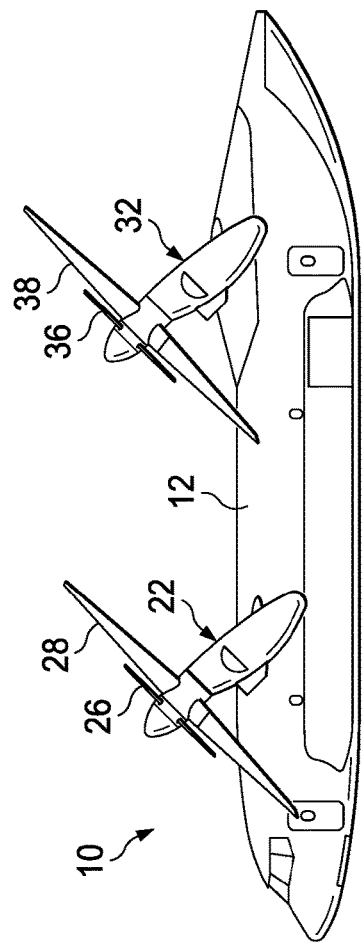
Figure 3H:
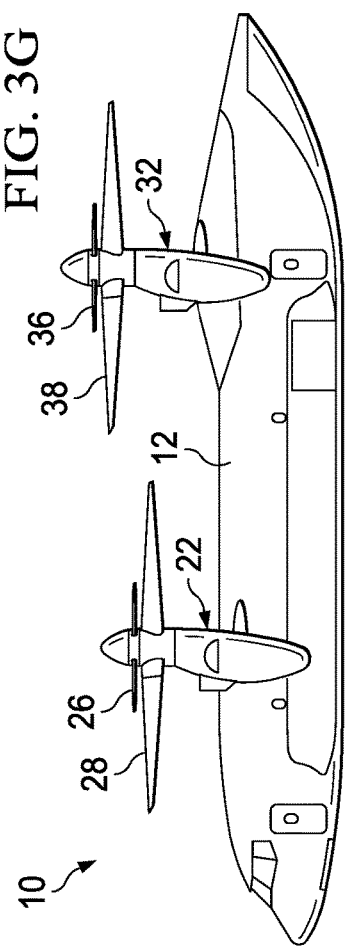
Figure 3I:
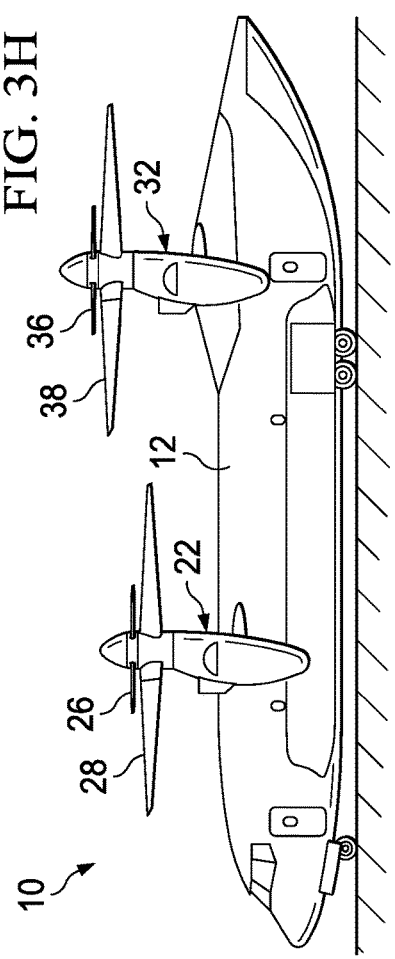

When aircraft 10 begins its approach to the destination, larger rotor assemblies 28, 38 are reengaged by extending the rotor blades from the folded position, unlocking larger rotor assemblies 28, 38 and commencing the rotation of larger rotor assemblies 28, 38 aerodynamically and/or mechanically. As larger rotor assemblies 28, 38 ramp up to operating speed, power may be transitioned from smaller rotor assemblies 26, 36 to larger rotor assemblies 28, 38 using, for example, the clutch system or the differential assembly. Once larger rotor assemblies 28, 38 are providing the desired forward thrust, smaller rotor assemblies 26, 36 may be stopped and feathered, if desired. Aircraft 10 may now begin its transition from forward flight mode to vertical takeoff and landing flight mode. As best seen in FIGS. 3F-3H, as aircraft 10 transitions from forward flight mode to vertical takeoff and landing flight mode, propulsion assemblies 22, 32 transition from the forward thrust orientation, as best seen in FIG. 3F, to the vertical lift orientation, as best seen in FIG. 3H, by tilting from the forward pointing thrust orientation to the upward pointing thrust orientation. It is noted that aircraft 10 remains in a generally horizontal attitude during this transition for the safety and comfort of passengers, crew and/or cargo carried in aircraft 10. Once aircraft 10 has completed the transition to vertical takeoff and landing flight mode, as best seen in FIG. 3H, aircraft 10 may commence its vertical descent to a landing surface at the destination location. As best seen in FIG. 3I, aircraft 10 has landed and is resting on the surface. Aircraft 10 may now engage in ground maneuvers, if desired.

Figure 4A:
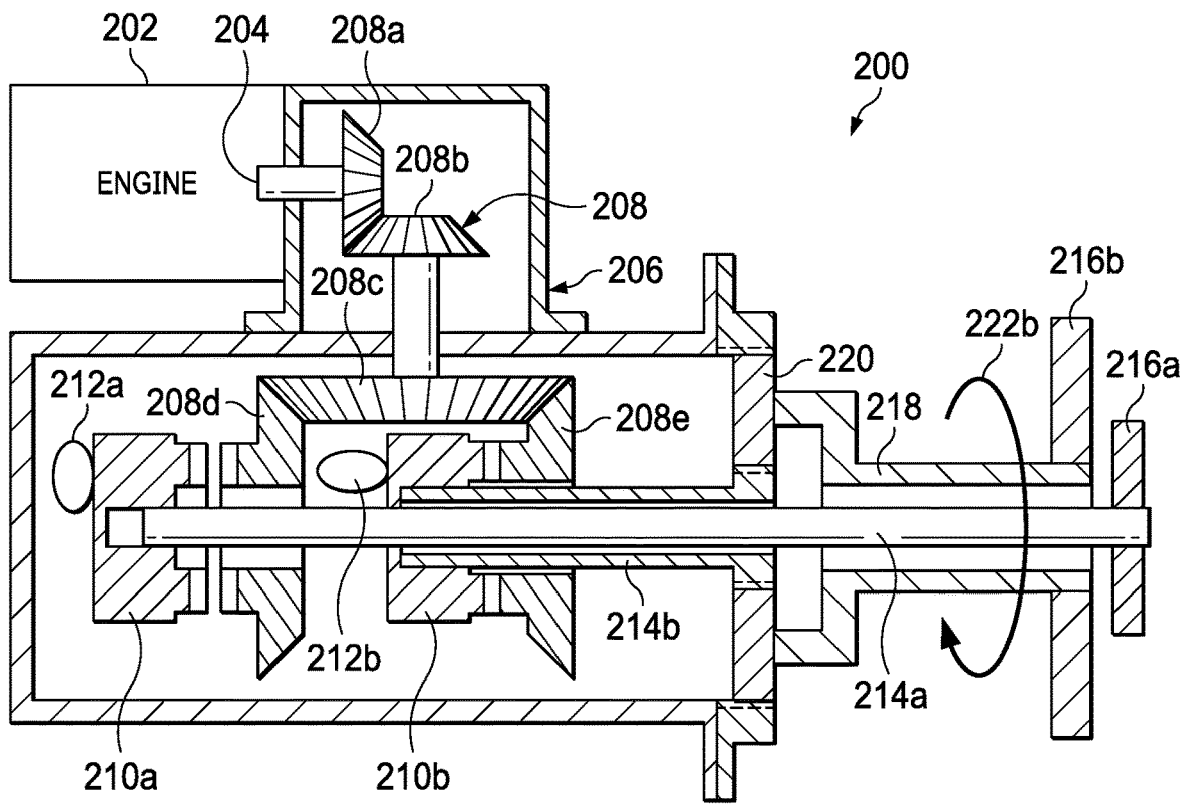
FIGS. 4A-4B are schematic illustrations of a dual rotor propulsion system for a tiltrotor aircraft in accordance with embodiments of the present disclosure.
Figure 4B:
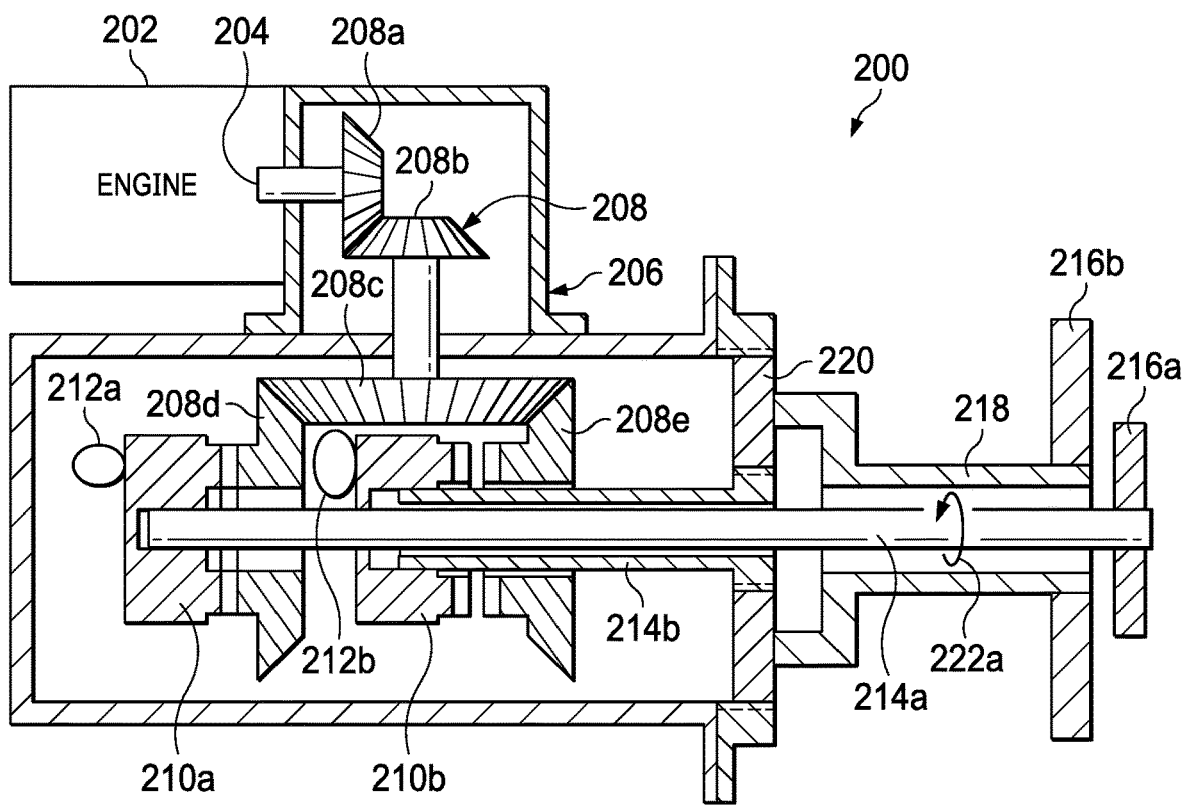
Figure 7:
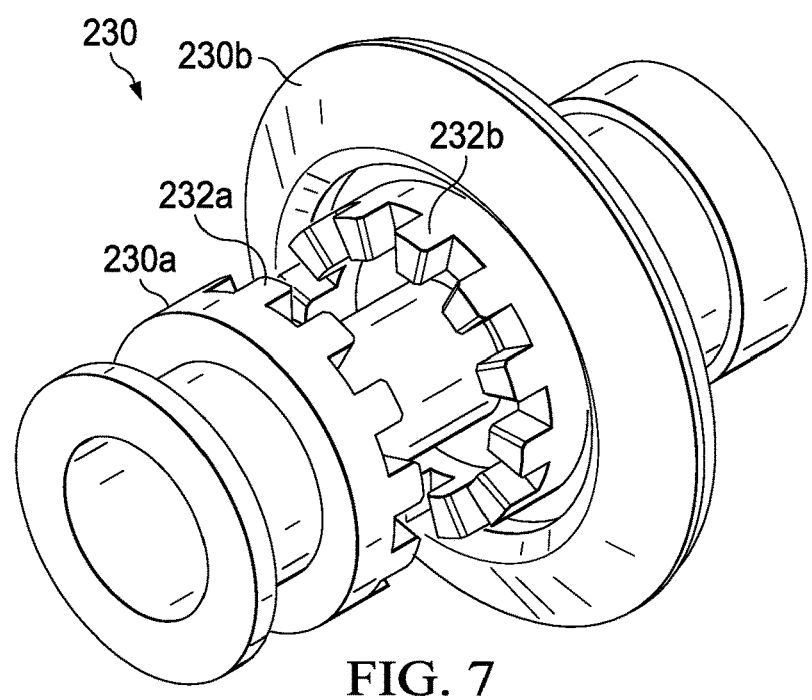
FIG. 7 is an isometric view of a clutch assembly for a dual rotor propulsion system of a tiltrotor aircraft in accordance with embodiments of the present disclosure.

Referring next to FIGS. 4A-4B in the drawings, a dual rotor propulsion system for a tiltrotor aircraft is depicted and generally designated 200. Dual rotor propulsion system 200 includes an engine 202 having an output shaft 204. Dual rotor propulsion system 200 also includes a transmission 206 that is coupled to output shaft 204 of engine 202. Transmission 206 includes a gear train 208 depicted as input bevel gears 208a, 208b, drive bevel gear 208c and output bevel gears 208d, 208e. Transmission 206 also includes a clutch system depicted as clutch 210a and clutch 210b that are selectively engaged and disengaged with output bevel gears 208d, 208e of gear train 208. In the illustrated embodiment, clutch 210a and clutch 210b engage and disengage with output bevel gears 208d, 208e by operation of a cam system depicted as cam 212a and cam 212b that may operate independently or simultaneously. Clutch 210a and clutch 210b may be any suitable clutch assembly such as curvic clutch 230 depicted in FIG. 7. Curvic clutch 230 includes two clutch plates 230a, 230b that selectively couple together by meshing together tapered teeth 232a, 232b on the end faces of each clutch plate 230a, 230b. Returning to FIGS. 4A-4B, clutch 210a is coupled to output shaft 214a that is coupled to the smaller rotor assembly 216a, only the rotor hub of smaller rotor assembly 216a being shown in the figures. Also, in the illustrated embodiment, clutch 210b is coupled to output shaft 214b that is coupled to larger rotor assembly 216b, only the rotor hub of larger rotor assembly 216b being shown in the figures, via a mast 218 and a planetary gear assembly 220.

FIG. 4A shows dual rotor propulsion system 200 in the vertical takeoff and landing flight mode of aircraft 10 wherein input torque and rotation energy are provided by engine 202 to input bevel gears 208a, 208b by output shaft 204. Torque is transferred through gear train 208 to generate output torque from output bevel gear 208e through clutch 210b to output shaft 214b. The torque and rotational energy from output shaft 214b then passes through planetary gear assembly 220 and mast 218 to larger rotor assembly 216b. The rotational speed is reduced through planetary gear assembly 220 such that engine 202 and larger rotor assembly 216a are both able to operate at optimized rotational speeds. Once aircraft 10 has completed the vertical takeoff and the transition to forward flight mode, aircraft 10 may now transition to high efficiency cruise mode.

In the illustrated embodiment, cam 212a and cam 212b, either independently or simultaneously operate to shift clutch 210a from the disengaged position to the engaged position with output bevel gear 208d and to shift clutch 210b from the engaged position to the disengaged position with output bevel gear 208e. FIG. 4B shows dual rotor propulsion system 200 in the high efficiency cruise mode of aircraft 10 wherein input torque and rotation energy are provided by engine 202 to input bevel gears 208a, 208b by output shaft 204 of engine 202. Torque is transferred through gear train 208 to generate output torque from output bevel gear 208d through clutch 210a to output shaft 214a. The torque and rotational energy from output shaft 214a is transferred directly to smaller rotor assembly 216a. In this manner, smaller rotor assembly 216a rotates through its optimal gear train at a faster RPM than the larger rotor assembly 216b while engine 202 maintains a constant rotational speed. In addition, it is noted that smaller rotor assembly 216a and larger rotor assembly 216b counter-rotate in the illustrated embodiment as indicated by motion arrow 222a associated with output shaft 214a in FIG. 4B and motion arrow 222b associated with mast 218 in FIG. 4A. When aircraft 10 is approaching its destination, aircraft 10 will transition back to vertical takeoff and landing flight mode. In the illustrated embodiment, cam 212a and cam 212b, either independently or simultaneously operate to shift clutch 210b from the disengaged position to the engaged position with output bevel gear 208e and to shift clutch 210a from the engaged position to the disengaged position with output bevel gear 208d, as depicted in FIG. 4A.

Figure 5A:
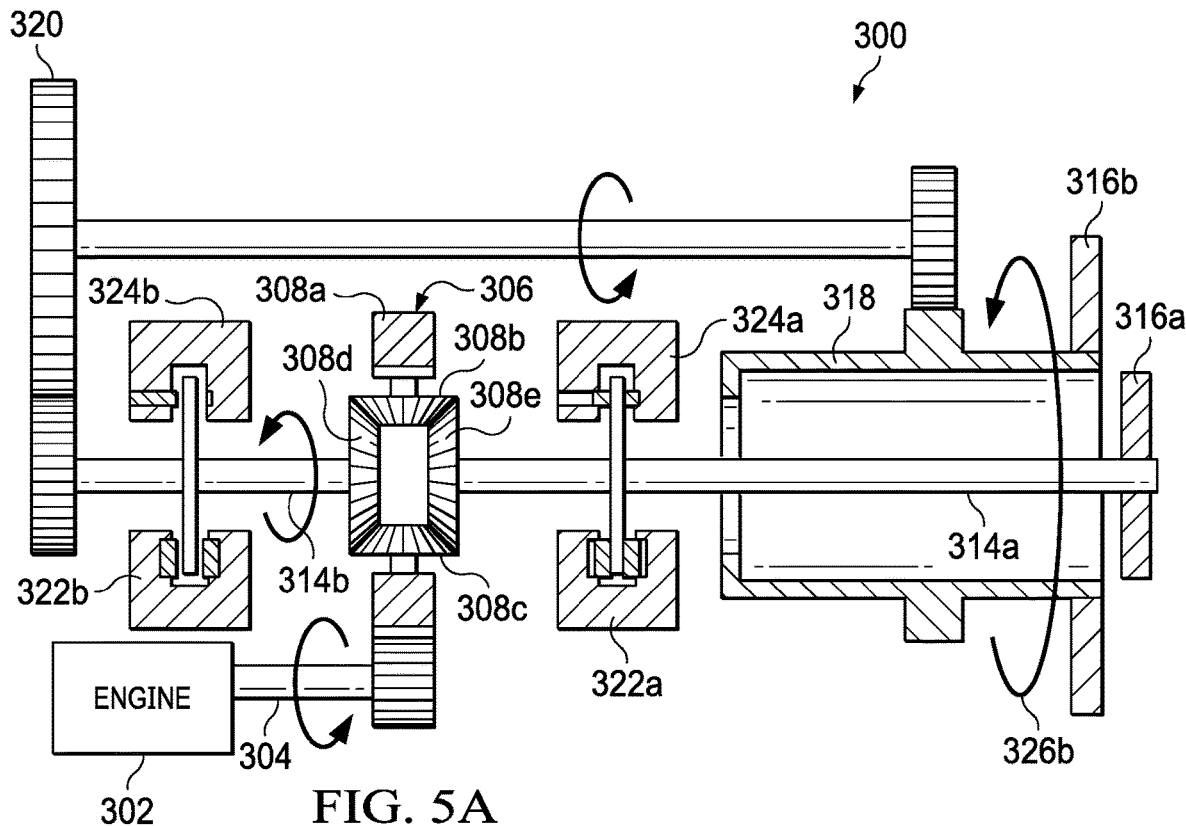
FIGS. 5A-5B are schematic illustrations of a dual rotor propulsion system for a tiltrotor aircraft in accordance with embodiments of the present disclosure.
Figure 5B:
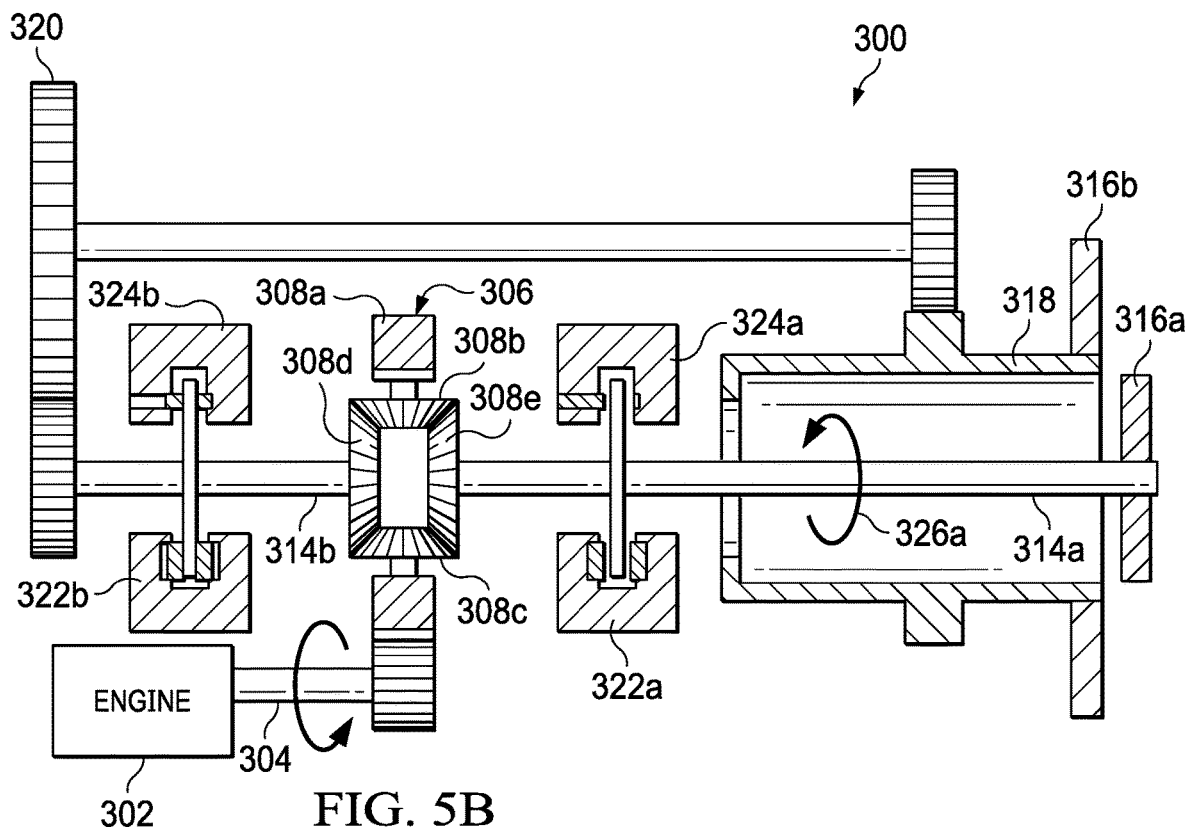

Referring next to FIGS. 5A-5B in the drawings, a dual rotor propulsion system for a tiltrotor aircraft is depicted and generally designated 300. Dual rotor propulsion system 300 includes an engine 302 having an output shaft 304. Dual rotor propulsion system 300 also includes a differential transmission 306 that is coupled to output shaft 304 of engine 302. Differential transmission 306 is depicted as including a ring gear 308a, a spider gear set includes spider gears 308b, 308c, output gear 308d and output gear 308e. In the illustrated embodiment, output gear 308e is coupled to output shaft 314a that is coupled to the smaller rotor assembly 316a, only the rotor hub of smaller rotor assembly 316a being shown in the figures. Also, in the illustrated embodiment, output gear 308d is coupled to output shaft 314b that is coupled to larger rotor assembly 316b, only the rotor hub of larger rotor assembly 316b being shown in the figures, via a mast 318 and a gear assembly 320. In the illustrated embodiment, an optional brake unit 322a, depicted as a rotor and caliper or disc brake, is operably associated with output shaft 314a and is operable to slow down and stop the rotation of smaller rotor assembly 316a. Brake unit 322a includes a lock assembly 324a depicted as a pin operable to pass through an opening in the brake rotor. Lock assembly 324a is operable to prevent rotation of smaller rotor assembly 316a, acting as a redundant system to brake unit 322a. Similarly, an optional brake unit 322b is operably associated with output shaft 314b and is operable to slow down and stop the rotation of larger rotor assembly 316b. Brake unit 322b includes a lock assembly 324b that is operable to prevent rotation of larger rotor assembly 316b, acting as a redundant system to brake unit 322b.

FIG. 5A shows dual rotor propulsion system 300 in the vertical takeoff and landing flight mode of aircraft 10. In this configuration, brake unit 322a and lock assembly 324a are preferably engaged with output shaft 314a to prevent rotation of smaller rotor assembly 316a. Brake unit 322b and lock assembly 324b are disengaged with output shaft 314b to allow rotation of larger rotor assembly 316b. Input torque and rotation energy are provided by engine 302 to ring gear 308a by output shaft 304. Torque is transferred through differential transmission 306 to generate output torque from output gear 308d to output shaft 314b. The torque and rotational energy from output shaft 314b then passes through gear assembly 320 and mast 318 to larger rotor assembly 316b. The rotational speed is reduced through gear assembly 320 such that engine 302 and larger rotor assembly 316b are both able to operate at optimized rotational speeds. Once aircraft 10 has completed the vertical takeoff and the transition to forward flight mode, aircraft 10 may now transition to high efficiency cruise mode.

This transition includes releasing brake unit 322a and lock assembly 324a from output shaft 314a to allow rotation of smaller rotor assembly 316a. The input torque and rotation energy provided by engine 302 to ring gear 308a is now split by differential transmission 306 to deliver a first portion of the output torque to output gear 308d and output shaft 314b and a second portion of the output torque to output gear 308e and output shaft 314a. As the rotational speed of output shaft 314a increases, the rotational speed of output shaft 314b decreases according to the following relationship: the rotational speed of ring gear 308a is equal to half the sum of the rotational speed of output shaft 314a and the rotational speed of output shaft 314b. The maximum rotational speed of output shaft 314b occurs when output shaft 314a is not rotating. Likewise, the maximum rotational speed of output shaft 314a occurs when output shaft 314b is not rotating. Thus, in order to further increase the rotational speed of smaller rotor assembly 316a, the rotational speed of larger rotor assembly 316b is reduced by increasing the pitch of its rotor blades. The increased pitch increases the torque required to rotate larger rotor assembly 316b, causing differential transmission 306 to pass additional power to smaller rotor assembly 316a. In effect, the rotor blade feathering of larger rotor assembly 316b operates as an aerodynamic brake. Braking of larger rotor assembly 316b can also be facilitated mechanically using break unit 322b. Once output shaft 314b has been stopped and indexed to a desired orientation, lock assembly 324b may be engaged by inserting a pin through an opening in the brake rotor, for example.

FIG. 5B shows dual rotor propulsion system 300 in the high efficiency cruise mode of aircraft 10. In this configuration, brake unit 322a and lock assembly 324a are disengaged with output shaft 314a to allow rotation of smaller rotor assembly 316a. Brake unit 322b and lock assembly 324b are engaged with output shaft 314b to prevent rotation of larger rotor assembly 316b. Input torque and rotation energy are provided by engine 302 to ring gear 308a by output shaft 304 of engine 302. Torque is transferred through differential transmission 306 to generate output torque from output gear 308e to output shaft 314a. The torque and rotational energy from output shaft 314a is transferred directly to smaller rotor assembly 316a. In this manner, smaller rotor assembly 316a absorbs all engine power rotating optimally faster than larger rotor assembly 316b while engine 302 maintains its optimal and constant rotational speed. In addition, it is noted that smaller rotor assembly 316a and larger rotor assembly 316b co-rotate in the illustrated embodiment as indicated by motion arrow 326a associated with output shaft 314a in FIG. 5B and motion arrow 326b associated with mast 318 in FIG. 5A.

When aircraft 10 is approaching its destination, aircraft 10 will transition back to vertical takeoff and landing flight mode. This transition includes releasing brake unit 322b and lock assembly 324b from output shaft 314b to allow rotation of larger rotor assembly 316b. The input torque and rotation energy provided by engine 302 to ring gear 308a is now split by differential transmission 306 to deliver a first portion of the output torque to output gear 308d and output shaft 314b and a second portion of the output torque to output gear 308e and output shaft 314a. As the rotational speed of output shaft 314b increases, the rotational speed of output shaft 314a decreases. In order to further increase the rotational speed of larger rotor assembly 316b, the rotational speed of smaller rotor assembly 316a is reduced by increasing the pitch of its rotor blades as an aerodynamic brake and/or applying break unit 322a as a mechanical brake. As the torque required to rotate smaller rotor assembly 316a increases, differential transmission 306 passes additional power to larger rotor assembly 316b. Once output shaft 314s has been stopped and indexed to a desired orientation, lock assembly 324s may be engaged by inserting a pin through an opening in the brake rotor, for example.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a vertical takeoff and landing flight mode and a forward flight mode, the aircraft comprising:
    a longitudinally extending fuselage;
    a first wing extending laterally from the fuselage, the first wing having first and second outboard ends;
    a second wing extending laterally from the fuselage aft of the first wing, the second wing having third and fourth outboard ends;
    first and second dual rotor propulsion systems respectively coupled to the first wing between the fuselage and the first and second outboard ends, the first and second dual rotor propulsion systems reversibly tiltable relative to the first wing between vertical lift and forward thrust orientations;
    third and fourth dual rotor propulsion systems respectively coupled to the second wing between the fuselage and the third and fourth outboard ends, the third and fourth dual rotor propulsion systems reversibly tiltable relative to the second wing between vertical lift and forward thrust orientations, each dual rotor propulsion system including:
    an engine operable to provide an input torque;
    a transmission coupled to the engine and operable to receive the input torque and generate an output torque;
    a first output shaft coupled to the transmission and operable to receive a first portion of the output torque;
    a first rotor assembly coupled to and rotatable with the first output shaft;
    a second output shaft coupled to the transmission and operable to receive a second portion of the output torque; and
    a second rotor assembly coupled to and rotatable with the second output shaft;
    wherein, the first and second rotor assemblies rotate coaxially;
    wherein, the first rotor assembly has a different diameter than the second rotor assembly; and
    wherein, the first rotor assembly is stoppable and foldable in the forward flight mode.

2. The tiltrotor aircraft as recited in claim 1 wherein, for each dual rotor propulsion system, the transmission further comprises a clutch system operable to selectively engage and disengage torque paths to the first and second output shafts.

3. The tiltrotor aircraft as recited in claim 1 wherein, for each dual rotor propulsion system, the first rotor assembly has a larger diameter than the second rotor assembly.

4. The tiltrotor aircraft as recited in claim 1 wherein, for each dual rotor propulsion system, the first rotor assembly is aft of the second rotor assembly in the forward flight mode.

5. The tiltrotor aircraft as recited in claim 1 wherein, for each dual rotor propulsion system, the first and second rotor assemblies co-rotate.

6. The tiltrotor aircraft as recited in claim 1 wherein, for each dual rotor propulsion system, the first and second rotor assemblies counter-rotate.

7. The tiltrotor aircraft as recited in claim 1 wherein, for each dual rotor propulsion system, the second rotor assembly further comprises a rigid rotor.

8. The tiltrotor aircraft as recited in claim 1 wherein, for each dual rotor propulsion system, the second rotor assembly further comprises collective pitch control.

9. The tiltrotor aircraft as recited in claim 1 wherein, for each dual rotor propulsion system, the first rotor assembly further comprises a gimbaled rotor.

10. The tiltrotor aircraft as recited in claim 1 wherein, for each dual rotor propulsion system, the first rotor assembly further comprises collective pitch control and cyclic pitch control.

11. The tiltrotor aircraft as recited in claim 1 wherein, for each dual rotor propulsion system, the first rotor assembly further comprises a rigid rotor having collective pitch control.

12. The tiltrotor aircraft as recited in claim 1 wherein, for each dual rotor propulsion system, the first rotor assembly is aerodynamically stoppable responsive to rotor blade feathering.

13. The tiltrotor aircraft as recited in claim 1 wherein each dual rotor propulsion system further comprises a brake unit operably associated with the first output shaft that is configured to stop the rotation of the first rotor assembly.

14. The tiltrotor aircraft as recited in claim 1 wherein each dual rotor propulsion system further comprises a lock assembly operably associated with the first output shaft that is configured to prevent rotation of the first rotor assembly.

15. The tiltrotor aircraft as recited in claim 1 wherein each dual rotor propulsion system further comprises a brake unit operably associated with the second output shaft that is configured to stop the rotation of the second rotor assembly.

16. The tiltrotor aircraft as recited in claim 1 wherein each dual rotor propulsion system further comprises a lock assembly operably associated with the second output shaft that is configured to prevent rotation of the second rotor assembly.

17. The tiltrotor aircraft as recited in claim 1 wherein, for each dual rotor propulsion system, the transmission further comprises a differential transmission operable to split torque paths to the first and second output shafts.

18. The tiltrotor aircraft as recited in claim 17 wherein, for each dual rotor propulsion system, the differential transmission further comprises a ring gear, a spider gear set coupled to the ring gear, a first output gear coupled between the spider gear set and the first output shaft and a second output gear coupled between the spider gear set and the second output shaft;

wherein a rotational speed of the ring gear is equal to half the sum of a rotational speed of the first output shaft and a rotational speed of the second output shaft; and wherein at a constant engine operating speed, reduction in a rotational speed of the first rotor assembly causes an increase in a rotational speed of the second rotor assembly up to a maximum rotational speed of the second rotor assembly when rotation of the first rotor assembly is stopped.

* * * * *